INVENTORS
SVEN A. ROOSILD,
WALTER A. McLAUGHLIN AND
BY LESTER F. LOWE

United States Patent Office 3,556,658
Patented Jan. 19, 1971

3,556,658
METHOD OF MEASURING ION BEAM HOMOGENEITY
Sven A. Roosild, Billerica, Walter A. McLaughlin, Burlington, and Lester F. Lowe, Bedford, Mass., assignors to the United States of America as represented by the Secretary of the Air Force
Filed Jan. 14, 1970, Ser. No. 2,707
Int. Cl. G01n 1/00
U.S. Cl. 356—36                                                    5 Claims

ABSTRACT OF THE DISCLOSURE

A method for measuring ion beam homogeneity in high energy accelerating equipment by placing a wafer of a thermal oxide in the path of the beam, bombarding the wafer with ions, etching the wafer with acid and measuring the discontinuity in the bombarded surface to determine the location of variations in intensity in the beam.

BACKGROUND OF THE INVENTION

This invention relates generally to a method for measuring ion beams, and more specifically to a method for measuring the homogeneity of ion beams emerging from high energy accelerated devices.

With the increased use of semiconductor equipment and the more recent technological advances in the field of ion implantation, the use of high energy accelerated equipment in these areas has vastly increased. With the more sophisticated devices being developed and formed, such as integrated circuits and ion-implanted semiconductor devices, the need for more exact measurement of ion beams has grown drastically. The miniature and subminiature devices now formed with semiconductors call for intense accuracy. One parameter of such accuracy is the ion beam homogeneity.

In the past, ion beam homogeneity was measured with Faraday cages which surrounded the beam and measured a current produced by ions flowing through the center of the cage. Another method of measurement was the use of crossed wires which, similar to the Faraday cage method, surrounded the beam and generated a current which was ultimately measured to give some degree of indication as to the diffusion of the ions in the beam. Such methods were sufficiently accurate where close tolerances were not critical as, for example, where an entire device would be bombarded or swept by a deflected ion beam.

Currently, specimens are bombarded with ion beams in selected locations to provide desired results. It is necessary, therefore, that the precise makeup of the beam be known. For example, a beam that is too intense near the center of the beam would cause ion bombardment to a much greater depth in the device than would the fringes of the beam. Any device bombarded by such a beam would provide inaccurate electrical performance and as a result of this could be even rendered completely useless. It is necessary, therefore, to provide a method such as the one shown whereby accuracy is obtained in measuring the cross-sectional homogeneity of the beam.

SUMMARY OF THE INVENTION

This invention provides a method for accurately measuring the energy of ions in an accelerated beam. In this method, a wafer of a thermal oxide is momentarily placed in the beam. After a predetermined bombardment by the beam, the wafer is removed and etched with a suitable acid. The discontinuities formed in the surface of the wafer by uneven radiation can be measured with a multiple beam interferometer or, alternatively, if less accuracy is required, the homogeneity of the beam may be determined by merely observing changes in color of the etched wafer. A completely homogeneous beam will leave the wafer with a uniform color. However, areas where the beam has bombarded the wafer with high energy, the wafer will be more deeply etched by the acid, resulting in a substantially different color than those areas struck by less energetic particles. Experience has shown that generally these colors will take on the form of rings. The color of these rings is easily calibrated, thereby providing a quick indication of relative ion energy in various locations on the cross-section of the beam.

It is therefore an object of this invention to provide a new and improved method for measuring the homogeneity of accelerated beams.

It is another object of this invention to provide a more accurate method of measuring ion beam cross-section homogeneity than hitherto known.

It is a further object of this invention to provide a new and improved method of measuring ion beam homogeneity which leaves a permanent record.

It is still another object of this invention to provide a new and improved method for measuring ion beam homogeneity which is relatively fast and more accurate than any hitherto known.

These and other advantages, features and objects of the invention will become more apparent from the following description taken in connection with the illustrative embodiment in the accompanying drawings, wherein.

DETAILED DESCRIPTION OF THE PREFERRED EMBODIMENT

Figure 1:
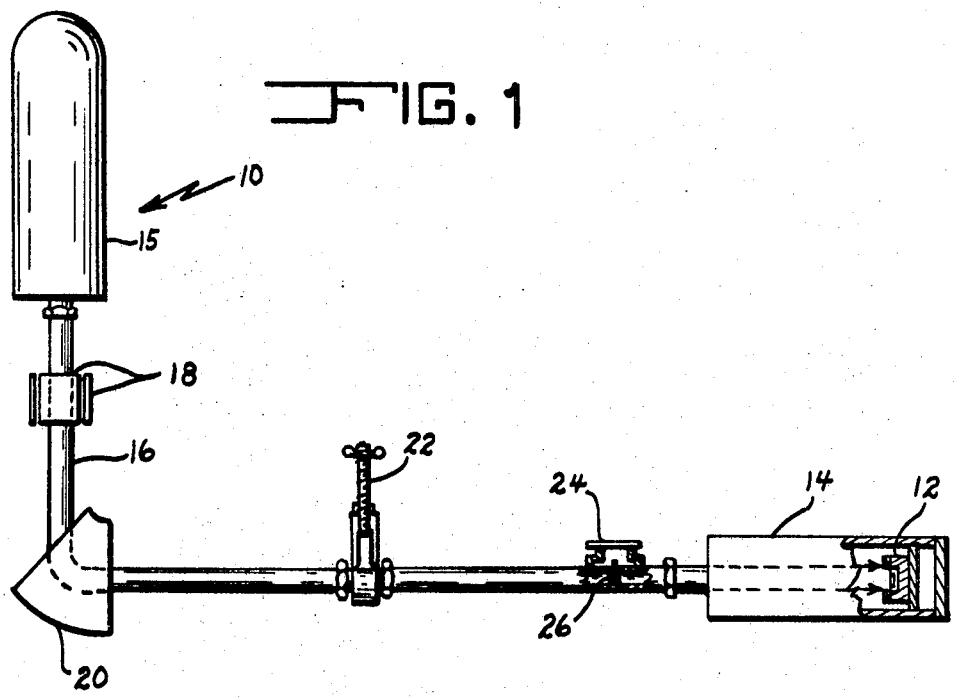
FIG. 1 is a side elevational view partly in section of a device capable of being employed in the method of the invention.

Referring now to FIG. 1, a mass spectrometer system is generally shown at 10 for accelerating ions of various types into the work piece 12 located in the chamber 14. The method may be practiced with other heavy particles accelerators including Van de Graaff generators, Heavy Ion Linacs, and Cockcroft-Walten generators.

In the case of the mass spectrometer, the ions emanating from source 15 are accelerated along the tube 16, defocused by the magnets 18 and separated by mass by the magnet 20.

Located between the magnet 20 and the chamber 14 is a gate valve 22 which is designed to interrupt the flow of ions reaching the work piece 12 without turning off the source of ions 15. Between the gate valve and chamber is a door 24 located in the side of tube 16. The door is so designed as to permit the insertion and withdrawal of a sample wafer 26 after the gate valve 22 has prevented the flow of ions in that region.

Figure 2A:
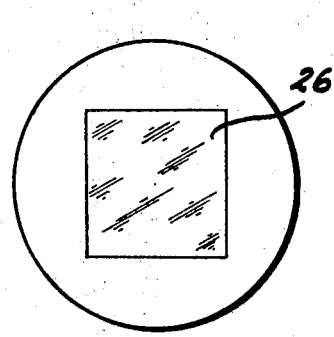
FIG. 2A is a representation of a sample wafer exposed to a homogeneous ion beam.
Figure 2B:
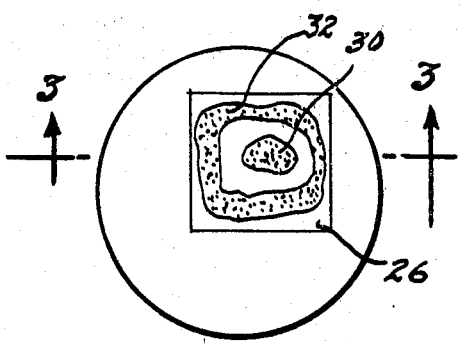
FIG. 2B is a representation of a sample wafer exposed to a nonhomogeneous ion beam.
Figure 3:
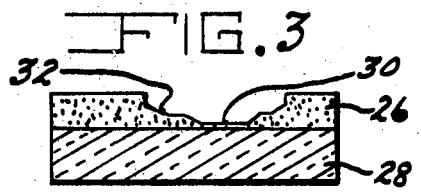
FIG. 3 is a cross-sectional view of a sample wafer exposed to a nonhomogeneous beam.

If the ions in the beam are homogeneous the wafer 12, after being bombarded by the ions and processes, will appear as shown in FIG. 2A, completely uniform in color and surface cavitation. Alternatively, if the beam is nonhomogeneous, the wafer will appear as shown in FIG. 2B. The wafer may be made up as shown in FIG. 3. A thermal oxide layer 26 is formed in excess of 4000 angstroms thick on a silicon base 28 by thermal oxidation. Once the oxide has been bombarded the charged particles that pass into or through the oxide (in this instance, silicon dioxide), the etch rate of the oxide varies in proportion to the intensity of the charged particle beam.

The wafer, after bombardment, is etched for two minutes with hydrofluoric acid providing the result shown in FIG. 3 for a nonhomogeneous beam. At a point of maximum intensity 30 the oxide is etched to a much greater degree than in areas 32 of lower intensity where the etching is substantially reduced.

Once color and depth calibration charts have been prepared, it is possible to readily determined whether particular areas of the beam have ions which are too energetic or too weak depending on the desired makeup of the beam. The charts used in connection with either a visual inspection for color or an interferometer for cavitational measurements will provide a fast, reliable indication of ion beam homogeneity.

We claim:

1. A method of measuring charged particle beam uniformity comprising the steps of: bombarding a target with a stream of charged particles; interrupting the flow of charged particles; placing an oxide coated wafer in the line of flow of the particles; bombarding the wafer with the charged particles; removing the wafer; etching the surface for a predetermined time; and measuring the discontinuities in the etched oxide surface to determine the uniformity of the beam.

2. A method of measuring according to claim 1 wherein said step of bombarding consists of bombarding the wafer with ions.

3. A method of measuring according to claim 1 wherein the etching step consists of etching said surface for two minutes.

4. A method of measuring according to claim 1 wherein said measuring step consists of measuring said discontinuities interferometrically.

5. A method of measuring according to claim 1 including the step of measuring said discontinuities by visual comparison with a color calibration chart.

References Cited

UNITED STATES PATENTS 2,666,355   1/1954   Trurnit.

RONALD L. WIBERT, Primary Examiner

T. MAJOR, Assistant Examiner